May 24, 1966  J. N. BOHN, JR  3,252,456
STEAM GENERATOR
Filed April 5, 1965
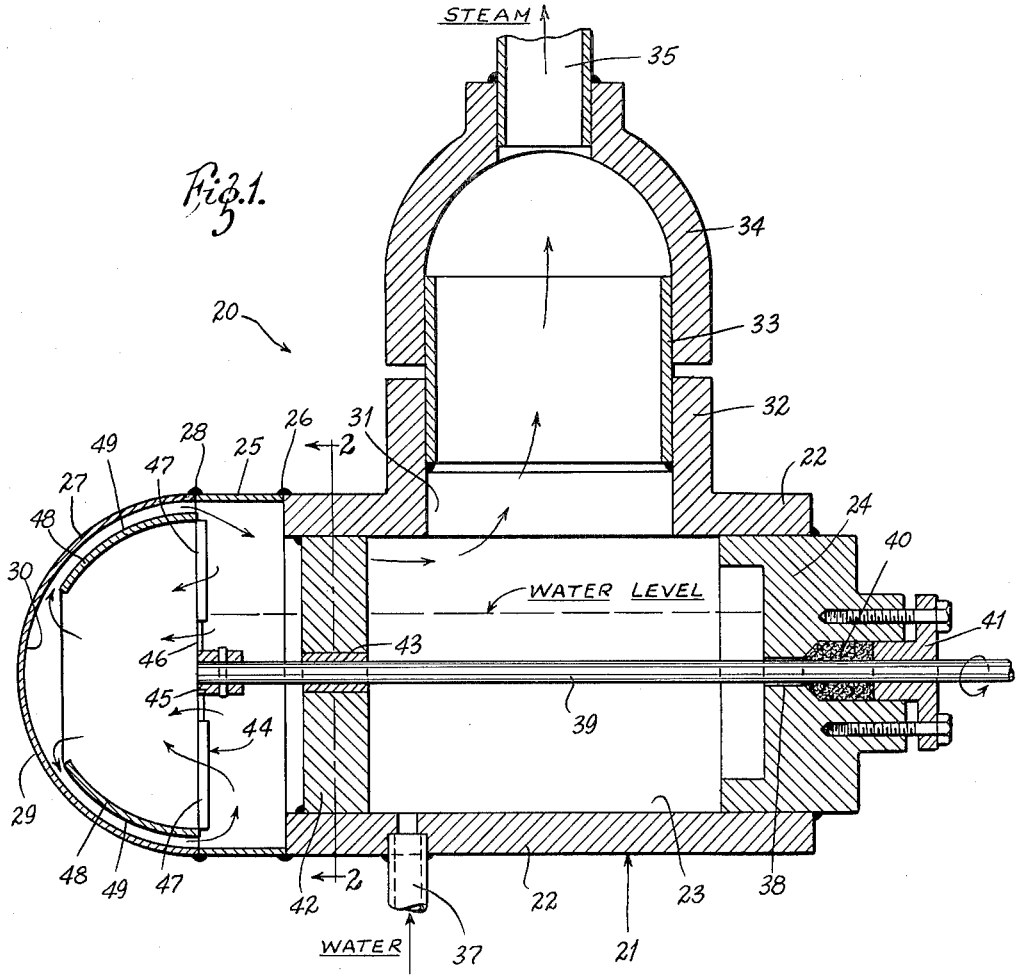
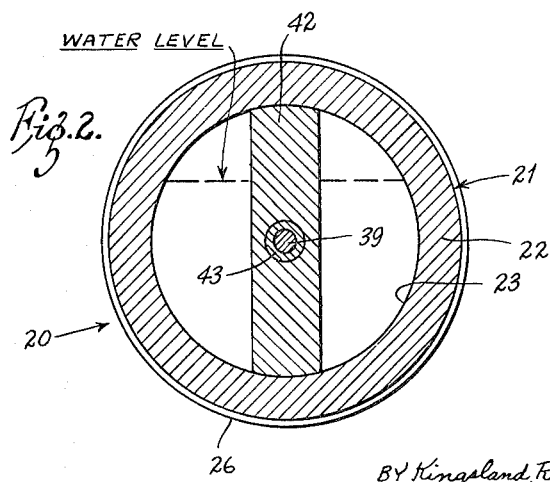
INVENTOR:
JAMES N. BOHN, JR.
BY Kingsland, Rogers, Ezell, Eilers & Robbins
ATTORNEYS

United States Patent Office 3,252,456
Patented May 24, 1966

3,252,456
STEAM GENERATOR
James N. Bohn, Jr., 1527 Faris Ave., Pagedale, Mo.
Filed Apr. 5, 1965, Ser. No. 445,637
3 Claims. (Cl. 126—271)

This invention relates to a steam generator and to the distillation of water. The principal object of the invention is to provide a steam generator that is economical and effective in its use of solar energy to convert water to steam.

In general, the invention comprises a water reservoir joined to a spherical heat transmitting wall. The heat transmitting wall has a heat ray accepting surface on its outer surface and an inner heating surface. Water from the reservoir is circulated across the heating surface to be heated. There is a water inlet to the reservoir and there is a steam outlet from the reservoir so that the reservoir is always kept supplied with water and so that steam which is generated by the device can be extracted. The entire device is mounted on a suitable movable platform controlled to follow the sun's diurnal path so that suitable reflectors, also carried by the platform, can always direct a maximum concentration of heat rays toward the heat accepting surface. The construction and control of the platform and the construction of the reflectors are known in the art and are not individually parts of this invention.

For maximum efficiency, it is necessary that the heat transmitting surface, including the accepting and heating surfaces, be spherical. This invention provides a device having such a spherical heat transmitting wall, while at the same time providing a means for removing the surface film of water from the heating surface to reduce heat losses and salt deposits on the surface. These objects are accomplished by providing impeller blades for circulating water toward the heating surface and vanes having curved outer edges which sweep past the heating surface in close proximity thereto and keep a thin film of water circulating past the heating surface at all times.

There are other objects and advantages to this invention which will be apparent to those skilled in the art.

In the drawing:

FIGURE 1 is a schematic view in vertical section through the longitudinal center of the device; and FIGURE 2 is a view in section taken along the line 2—2 of FIGURE 1.

Referring to the drawing, the solar heat evaporating system 20 of this invention has a housing 21 including a wall 22 that may be cylindrical or of other shape to define the lateral sides of a fluid reservoir 23. There is an end wall 24 across one end of the reservoir 23. At the other end of the reservoir, a sleeve 25 is joined to the wall 22 by a weld 26 or by other fluid-tight means, and a semi-spherical heat transmitting wall 27 made of a suitable highly heat conductive metal is to be joined to the sleeve 25 by a similar welded seam 28. The heat transmitting wall 27 has an accepting surface 29 which is exposed to sun rays, preferably focused from a large reflector as is known in the art. The wall 27 also has a heating surface 30 which heats water in the reservoir 23 by direct conduction, as will appear.

There is an opening 31 through a side of the wall 22 surrounded by a collar 32. A sleeve 33 is welded to the inner wall of the sleeve 32, and a cap 34 is removably fitted onto the sleeve in a fluid-tight fit. A pipe 35 is welded to the upper end of the cap 34. The pipe 35 may be connected to any desired steam collector, such as a condenser or the like (not shown).

A water inlet pipe 37 is connected through another side of the wall 22. The pipe 37 is connected to a water source (not shown) to keep the reservoir supplied with a desirable volume of water. Suitable control means, not shown but well known in the art, maintain a proper level of water within the reservoir 23.

There is a hole 38 through the end wall 24 through which a shaft 39 extends. A suitable bearing or packing 40, adjusted in place by a clamping plate 41, is mounted in the end wall 24 and supports the shaft 39. A bearing support bar 42 is mounted between and welded to opposite sides of the wall 22 adjacent the sleeve 25. The bearing support bar 42 supports a suitable bearing 43, and the shaft 39 extends through the bearing 43. The shaft 39 is connected to a motor (not shown).

On the end of the shaft 39 adjacent the heat transmitting wall 27, there is a water circulating fan 44. The water circulating fan 44 comprises a hub 45 fastened to the shaft 39. A disk 46 extends radially outwardly from the hub 45 and supports a plurality of blades 47. A plurality of vanes 48 are supported by the outer edges of the blades 47. The vanes 48 are shaped to provide outer edges 49 that parallel the spherical inner heating surface 30 of the heat transmitting wall 27. There is space between the edges 49 and the surface 30, but they are close together.

Although there may be some variations in the pitches of the blades 47 and vanes 48, they are preferably directed so that the blades 47 draw and direct water generally centrally toward the heating surface 30, while the vanes 48 sweep the water radially outwardly across the heating surface 49. Because the vanes 48 are close to the surface 49, a thin film of water flows across the heating surface 49.

In operation, the device is mounted so that the accepting surface 29 always receives a maximum concentration of rays from the sun. These rays are transmitted through the metal wall 27 to the heating surface 30 by conduction. The blades 46 rotate as the shaft 39 is rotated, and direct water from the reservoir 23 toward the central portion of the heating surface 30. The vanes 48 draw this water in a thin film across the heating surface 30. As the thin film of water moves across the heating surface 30, it absorbs heat. Some of the water flashes into steam, and much of the steam is drawn off through the pipe 35. Some of the steam passes back into the water in the reservoir 23 and may condense again into water, but if so, that steam heats the water within the reservoir and makes conversion of such water to steam easier.

The blades 47 thus circulate the water. The vanes 48 keep the water in a thin film in the area of contact with the heating surface 30 and they keep the thin film in motion to prevent heat losses from the film of water back through the wall 27. The vanes also prevent salt deposits from collecting on the heating surface 30 and reducing its effectiveness.

Various changes and modifications may be made within the purview of this invention as will be readily apparent to those skilled in the art. Such changes and modifications are within the scope and teaching of this invention as defined by the claims appended thereto.

What is claimed is:

1. An evaporating system comprising a housing defining a reservoir, a heat transmitting spherical wall in communication with the reesrvoir, the heat transmitting spherical wall having an external solar heat accepting surface adapted to be positioned in the path of sun rays, and an internal heating surface, means to introduce water into the reservoir, means to withdraw steam from the reservoir, a rotary shaft supported by the housing, a plurality of blades connected to the rotary shaft for circulating water toward the internal heating surface from the reservoir, and a plurality of vanes supported from the shaft for sweeping water in a thin film across the internal heating surface.

2. An evaporating system comprising means defining a fluid reservoir, means to introduce water to the fluid reservoir, means to withdraw steam from the fluid reservoir, wall means defining a solar heating area, an outer surface of the wall means being adapted to be positioned in the path of sun rays, means communicating an inner surface of the wall means with the reservoir, a plurality of blades, means to rotate the blades to direct water toward the inner heating surface, a plurality of vanes carried by the blades, the vanes having outer edges which parallel the contour of the inner surface of the heating wall.

3. The combination of claim 2 wherein the wall means is spherical.

References Cited by the Examiner

UNITED STATES PATENTS

| | | | |
|---|---|---|---|
| 1,700,675 | 1/1929 | Goddard | 126—271 |
| 1,951,403 | 3/1934 | Goddard | 126—271 |
| 1,969,839 | 8/1934 | Goddard | 126—271 |
| 2,388,940 | 11/1945 | Taylor | 126—271 |

CHARLES J. MYHRE, *Primary Examiner.*